(12) United States Patent
Chopra et al.

(10) Patent No.: US 11,646,427 B2
(45) Date of Patent: May 9, 2023

(54) PRINTABLE ULTRA-VIOLET LIGHT EMITTING DIODE CURABLE ELECTROLYTE FOR THIN-FILM BATTERIES

(71) Applicants: Xerox Corporation, Norwalk, CT (US); National Research Council of Canada, Ottawa (CA)

(72) Inventors: Naveen Chopra, Oakville (CA); Biby Esther Abraham, Mississauga (CA); Gregory McGuire, Oakville (CA); Robert Black, Milton (CA); Alexis Laforgue, Montreal (CA)

(73) Assignee: Xerox Corporation, Norwalk, CT (US)

( * ) Notice: Subject to any disclaimer, the term of this patent is extended or adjusted under 35 U.S.C. 154(b) by 247 days.

(21) Appl. No.: 17/095,681

(22) Filed: Nov. 11, 2020

(65) Prior Publication Data
US 2022/0149390 A1 May 12, 2022

(51) Int. Cl.
| | |
|---|---|
| *H01M 6/40* | (2006.01) |
| *C08F 283/06* | (2006.01) |
| *C08K 3/22* | (2006.01) |
| *C08K 3/28* | (2006.01) |
| *H01M 4/04* | (2006.01) |
| *H01M 6/18* | (2006.01) |

(52) U.S. Cl.
CPC ............ *H01M 6/40* (2013.01); *C08F 283/06* (2013.01); *C08K 3/22* (2013.01); *C08K 3/28* (2013.01); *H01M 4/0402* (2013.01); *H01M 6/181* (2013.01); *H01M 6/185* (2013.01); *H01M 6/188* (2013.01); *H01M 2300/0071* (2013.01); *H01M 2300/0082* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 3,138,567 A | 6/1964 | Abrams et al. |
| 6,379,835 B1 | 4/2002 | Kucherovsky |
| 6,682,823 B2 | 1/2004 | Okada |
| 6,916,577 B2 | 7/2005 | Parent et al. |
| 7,394,382 B2 | 7/2008 | Nitzan et al. |
| 8,492,033 B2 | 7/2013 | Amine et al. |
| 2013/0270491 A1 | 10/2013 | Park et al. |
| 2016/0054590 A1 | 2/2016 | Flitsch et al. |
| 2019/0035561 A1 | 1/2019 | Lockett et al. |

FOREIGN PATENT DOCUMENTS

| | | |
|---|---|---|
| CN | 103910757 A | 7/2014 |
| KR | 20200036604 A | 4/2020 |

OTHER PUBLICATIONS

Braam et al., A Stencil Printed, "High Energy Density Silver Oxide Battery Using a Novel Photopolymerizable Poly (acrylic acid) Separator," Adv. Mater. 2015, 27, 689-694.
Extended EP Search Report for EP21206999.1-1108, dated Mar. 16, 2022, 11 pages.

*Primary Examiner* — Sarah A. Slifka

(57) ABSTRACT

An example composition is disclosed. For example, the composition includes a ultra-violet (UV) curable mixture of water, an acid, a phosphine oxide with one or more photoinitiators, a water miscible polymer, a salt, and a neutralizing agent. The composition can be used to form an electrolyte layer that can be cured in the presence of air when printing the thin-film battery.

18 Claims, 4 Drawing Sheets

PRINTABLE ULTRA-VIOLET LIGHT EMITTING DIODE CURABLE ELECTROLYTE FOR THIN-FILM BATTERIES

The present disclosure relates generally to printed thin-film batteries and relates more particularly to a printable ultra-violet (UV) light emitting diode (LED) curable electrolyte for thin-film batteries.

BACKGROUND

Batteries are used to provide power to portable devices. Batteries generally include a cathode, an anode and a liquid electrolyte. Batteries can come in a variety of shapes, sizes, and voltages.

Thin-film batteries are a recent development in battery technology. Thin-film batteries use a series of layers that are deposited with high fidelity and accuracy. Printable thin-film batteries enable new form factors and power sources for applications such as: Internet of Things (IoT), wearables, and sensors, for example.

SUMMARY

According to aspects illustrated herein, there is provided an electrolyte for printed thin-film batteries, a battery with the electrolyte, and a method for fabricated the battery with the electrolyte. One disclosed feature of the embodiments is composition comprising an ultra-violet (UV) curable mixture of water, an acid, a phosphine oxide with one or more photoinitiators, a water miscible polymer, a salt, and a neutralizing agent.

Another disclosed feature of the embodiments is a battery. The battery comprises a cathode layer, an anode layer, and an electrolyte layer coupled to the cathode layer and the anode layer, wherein the electrolyte layer comprises a cross-linked polymer and phosphine oxide.

Another disclosure feature of the embodiments is a method. The method comprises printing a cathode layer, dispensing an electrolyte layer precursor composition onto the cathode layer, wherein the electrolyte layer precursor composition comprises a mixture of water, an acid, a phosphine oxide with one or more photoinitiators, a water miscible polymer, a salt, a neutralizing agent, and a cross-linker, ultraviolet light curing the electrolyte layer precursor composition in presence of air to form an electrolyte layer, printing an anode layer, and coupling the anode layer to the electrolyte layer.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an example a printable UV LED curable electrolyte for thin-film batteries and a method for fabricating the same. As discussed above, thin-film batteries are a recent development in battery technology. Thin-film batteries use a series of layers that are deposited with high fidelity and accuracy. Some thin-film batteries use a paper layer soaked in liquid electrolyte as the electrolyte layer. However, this may introduce complexity and additional challenges when making an all-printed battery. Leakage, reduced flexibility, and compromised sealing are problems with solution-based electrolyte layers.

The present disclosure provides a formulation for a curable gel electrolyte layer. The printable UV LED curable electrolyte layer is in a gel form that may eliminate the problems associated with leakage, reduced flexibility, and compromised sealing associated with solution-based electrolyte layers described above. Moreover, the solid gel form of the cured electrolyte may eliminate the need for a physical separator when a liquid electrolyte is used.

Some UV curable materials suffer from oxygen inhibition during cure. Oxygen inhibition can limit the effectiveness of cure, and more complex systems can be required, such as an inert blanket atmosphere (e.g., a nitrogen gas ($N_2$) blanket). The formulation of the UV LED curable electrolyte layer of the present disclosure can be cured in air. Thus, the requirement of an inert environment is eliminated.

In addition, the UV LED curable electrolyte layer of the present disclosure may cure much faster than other electrolyte layer formulations. For example, the UV LED curable electrolyte layer of the present disclosure may be cured within seconds rather than several minutes. Thus, the speed of the manufacturing process may also be improved.

Figure 1:
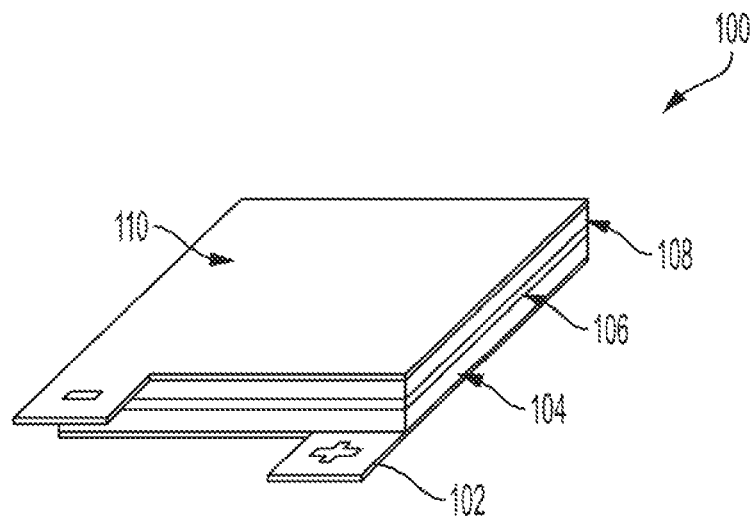
FIG. 1 illustrates a block diagram of an example thin-film battery of the present disclosure.

FIG. 1 illustrates an example thin-film printed battery 100 (also referred to herein as battery 100) of the present disclosure. In one embodiment, each layer of the battery 100 may be printed (e.g., via a three-dimensional (3D) printer). The battery 100 may be made out of materials, or printed in dimensions, that allow the battery 100 to be flexible.

In one embodiment, the battery 100 may include a cathode current collector 102, a cathode layer 104, an electrolyte layer 106 of the present disclosure, an anode layer 108, and an anode current collector 110. In one embodiment, the electrolyte layer 106 may be located between the cathode layer 104 and the anode layer 108. Said another way, the battery 100 may be fabricated such that the electrolyte layer 106 is formed on the cathode layer 104, and the anode layer 108 is formed on top of the electrolyte layer 106, or vice versa.

In one embodiment, the cathode current collector 102 and the anode current collector 110 may be fabricated from a conductive metal that can also be used as a material for 3D printing. For example, the cathode current collector 102 and the anode current collector 110 may be fabricated from silver (Ag).

In one embodiment, the cathode layer 104 and the anode layer 108 may also be printed using a material or compound that is compatible with 3D printers. For example, the cathode layer 104 may be fabricated from manganese dioxide (MnO$_2$) and the anode layer 108 may be fabricated from zinc (Zn).

In one embodiment, the electrolyte layer 106 may be printed with a formulation that can form a curable gel electrolyte layer. The formulation may be printable and UV curable in the presence of air. In other words, the formulation for the electrolyte layer 106 can be cured in the presences of oxygen or ambient conditions. Said another way, the formulation of the electrolyte layer 106 may not be sensitive to oxygen inhibition or require the presence of an inert blanket atmosphere (e.g., nitrogen (N$_2$) gas, Argon, Helium, and the like).

Figure 3:
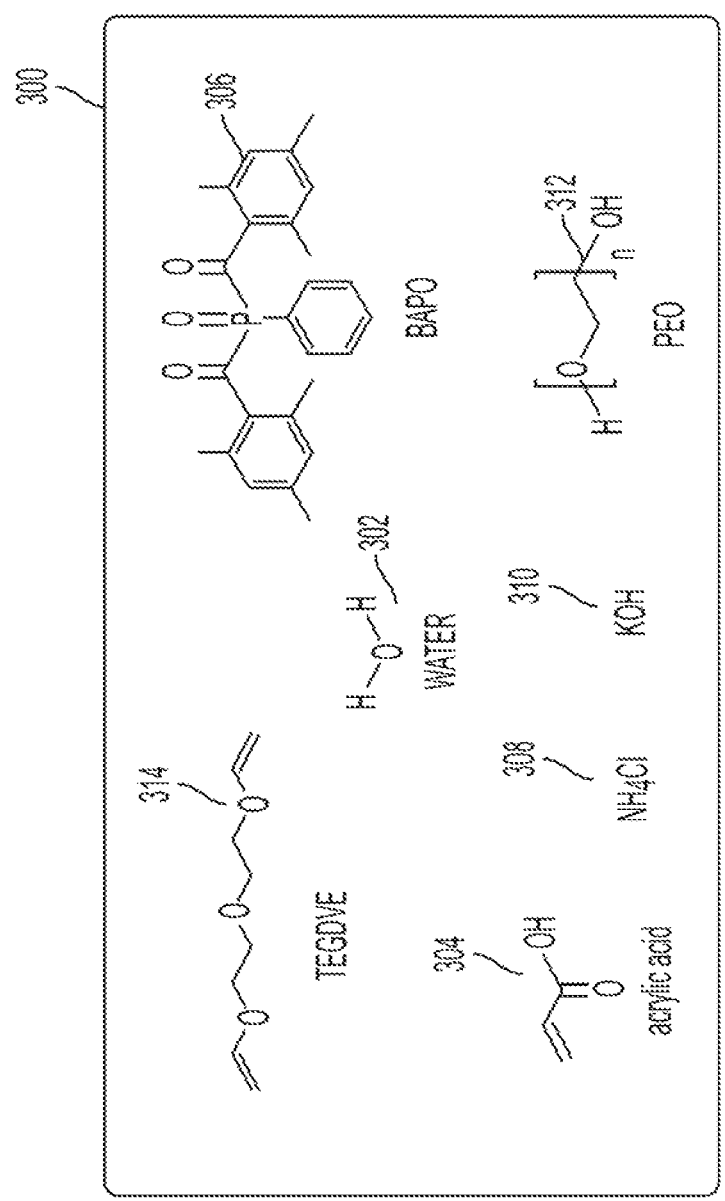
FIG. 3 illustrates example compounds that are used to formulate an example electrolyte of the present disclosure.

In addition, the formulation of the electrolyte layer 106 may cure much faster than previous electrolyte formulations. For example, the formulation of the electrolyte layer 106 may cure within seconds versus other electrolyte formulations that cure in several minutes. Examples of the formulation for the electrolyte layer 106 are illustrated in FIG. 3, and discussed in further details below.

Figure 2:
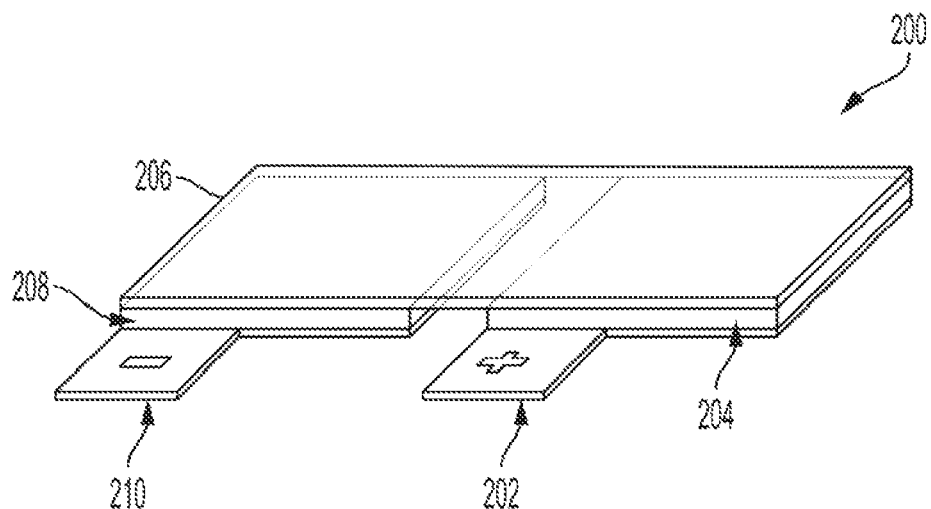
FIG. 2 illustrates a block diagram of another example of a thin-film battery of the present disclosure.

FIG. 2 illustrates another embodiment of an example thin-film printed battery 200 (also referred to herein as battery 200) of the present disclosure. In one embodiment, each layer of the battery 200 may be printed (e.g., via a 3D printer). The battery 200 may be made out of materials, or printed in dimensions, that allow the battery 200 to be flexible.

In one embodiment, the battery 200 may include a cathode current collector 202, a cathode layer 204, an electrolyte layer 206 of the present disclosure, an anode layer 208, and an anode current collector 210. In one embodiment, the cathode layer 204 and the anode layer 208 may be positioned side-by-side. For example, the electrolyte layer 206 may be located on top of both the cathode layer 204 and the anode layer 208. Said another way, the cathode layer 204 and the anode layer 208 may be coupled to the same side of the electrolyte layer 206 and positioned side-by-side, or adjacent to one another.

In one embodiment, the cathode current collector 202 and the anode current collector 210 may be fabricated from a conductive metal that can also be used as a material for 3D printing. For example, the cathode current collector 202 and the anode current collector 210 may be fabricated from silver (Ag).

In one embodiment, the cathode layer 204 and the anode layer 208 may also be printed using a material or compound that is compatible with 3D printers. For example, the cathode layer 204 may be fabricated from manganese dioxide (MnO$_2$) and the anode layer 208 may be fabricated from zinc (Zn).

In one embodiment, the electrolyte layer 206 may be printed with a formulation that can form a curable gel electrolyte layer. The formulation may be printable and UV curable in the presence of air. In other words, the formulation for the electrolyte layer 206 can be cured in the presences of oxygen or ambient conditions. Said another way, the formulation of the electrolyte layer 206 may not be sensitive to oxygen inhibition or require the presence of an inert blanket atmosphere (e.g., nitrogen (N$_2$) gas, Argon, Helium, and the like).

In addition, the formulation of the electrolyte layer 206 may cure much faster than previous electrolyte formulations. For example, the formulation of the electrolyte layer 206 may cure within seconds versus other electrolyte formulations that cure in several minutes. Examples of the formulation for the electrolyte layer 206 are illustrated in FIG. 3, and discussed in further details below.

In one embodiment, the electrolyte layer 206 may be formed from an electrolyte layer precursor composition. The electrolyte layer precursor composition may include a UV curable mixture of water, an acid, a phosphine oxide, a water miscible polymer, a salt, and a neutralizing agent. In one embodiment, the formulation 300 may also include a cross-linking agent.

In one embodiment, the water miscible polymer may include polyethylene oxide (PEO), polyvinyl pyrrolidone (PVP), polyvinyl alcohol (PVA), polyacrylamide, poly(2-alkyl-2-oxazolines), and polyphosphates. The water miscible polymer that is used should have certain properties, such as, good ion transport with lots of oxygenation.

In one embodiment, the salt may be any type of ionic salt. In one embodiment, the ionic salt may include chloric salts or bromic salts. For example, the salt may include ammonium chloride (NH$_4$Cl), potassium chloride, sodium chloride, lithium chloride, ammonium bromide, potassium bromide, sodium bromide, and lithium bromide.

In one embodiment, the neutralizing agent may include potassium hydroxide, lithium hydroxide, pyridine, trimethylamine, and the like. The neutralizing agent may be a base to create a salt of the acid. For example, if the acid is acrylic acid and the neutralizing agent is potassium hydroxide, then the neutralizing agent may create the potassium salt of the acrylic acid.

FIG. 3 illustrates an example formulation 300 of the electrolyte layer precursor composition that can be used to form the electrolyte layer 106 and 206 of the present disclosure. In one embodiment, the formulation 300 may include water, acrylic acid 304, phosphine oxide 306 with one or more photoinitiators, polyethylene oxide (PEO) 312, ammonium chloride (NH$_4$Cl) salt 308, potassium hydroxide (KOH) 310, and a cross-linker 314.

In one embodiment, the cross-linker 314 may be triethylene glycol divinyl ether (TEGDVE). In one embodiment, different variations of PEO 312 may be used depending on the formulation 300. For example, 10 weight percent (10 wt %) 600,000 molar volume PEO, 5 wt % 4,000,000 molar volume PEO, or 12 wt % 4,000,000 molar volume may be used in the formulation 300.

In one embodiment, the phosphine oxide 306 may be a long-wavelength UV absorbing photoinitiator that is typically sensitive to oxygen and does not exhibit good surface cure on its own. However, the formulation 300 of the present disclosure includes additional compounds with the phosphine oxide 306 that allow the formulation 300 to cure quickly (e.g., within seconds) under UV light emitting diodes (e.g., wavelengths of approximately 395 nanometers (nm) to 405 nm) without surface inhibition.

In one embodiment, the phosphine oxide 306 may be bisacylphosphine oxide (BAPO) or mono-acylphosphine oxide (MAPO). An example of the BAPO 306 may be a compound that is identified by its tradename Omnirad 819 or Irgacure 819. The MAPO may be Lucrin TPO (trimethylbenzoyl phosphine oxide CAS Number 75980-60-8), Lucrin TPO-L (Ethyl (2,4,6-trimethylbenzoyl) phenyl phosphinate CAS Number 84434-11-7), and the like.

In one embodiment, the formulation 300 may vary the amounts of the water 302, the acrylic acid 304, the BAPO 306, the PEO 312, the NH$_4$Cl salt 308, the KOH 310, and the cross-linker 314. The formulation 300 that is dispensed as the electrolyte layer 106 for the battery 100 or 200 may vary in weight between approximately 16 grams (g) and 100 g. In one embodiment, the water 302 may comprise between 31 weight percent to 37 weight percent of a total weight of the UV curable mixture or formulation 300. In one embodiment, the acrylic acid 304 may comprise between approximately 8 weight percent to 11 weight percent of a total weight of the UV curable mixture or formulation 300. In one embodiment, the BAPO 306 may comprise between 7 weight percent to 15 weight percent of a total weight of the UV curable mixture or formulation 300. In one embodiment, the $NH_4Cl$ salt 308 may comprise between 2 weight percent to 20 weight percent of a total weight of the UV curable mixture or formulation 300. In one embodiment, the KOH 310 may comprise between 6 weight percent to 9 weight percent of a total weight of the UV curable mixture or formulation 300. In one embodiment, the PEO 312 may comprise between 20 weight percent to 25 weight percent of a total weight of the UV curable mixture or formulation 300. In one embodiment, the cross-linker 314 may comprise between 2 weight percent to 4 weight percent of a total weight of the UV curable mixture or formulation 300.

Example compositions of the formulation 300 are provided below. The examples were prepared by mixing reagents in a glass vial with magnetic stirring. The PEO 312 was pre-dissolved in the water 302 prior to addition. The mixtures were allowed to stir overnight and were degassed with a stream of $N_2$ gas for 15 minutes prior to use.

Example 1

|  | Weight (g) | % |
| --- | --- | --- |
| Water | 6 | 36.6% |
| Acrylic Acid | 1.8 | 11% |
| KOH | 1.35 | 8.1% |
| $NH_4Cl$ | 0.34 | 2.1% |
| 600K PEO (10 wt %) | 3.9 | 23.8% |
| TEGDVE | 0.6 | 3.7% |
| BAPO | 2.4 | 14.7% |
| Total | 16.4 | 100% |

Example 2

|  | Weight (g) | % |
| --- | --- | --- |
| Water | 36.6 | 36.6% |
| Acrylic Acid | 11 | 11% |
| KOH | 8.1 | 8.1% |
| $NH_4Cl$ | 2.1 | 2.1% |
| 600K PEO (10 wt %) | 23.8 | 23.8% |
| TEGDVE | 3.7 | 3.7% |
| BAPO | 14.7 | 14.7% |
| Total | 16.4 | 100% |

Example 3

|  | Weight (g) | % |
| --- | --- | --- |
| Water | 6 | 32.0% |
| Acrylic Acid | 1.8 | 9.6% |
| KOH | 1.35 | 7.2% |
| $NH_4Cl$ | 2.72 | 14.5% |
| 600K PEO (10 wt %) | 3.9 | 20.8% |
| TEGDVE | 0.6 | 3.2% |
| BAPO | 2.4 | 12.8% |
| Total | 18.8 | 100% |

Example 4

|  | Weight (g) | % |
| --- | --- | --- |
| Water | 6.9 | 34.5% |
| Acrylic Acid | 1.92 | 9.6% |
| KOH | 1.4 | 7.0% |
| $NH_4Cl$ | 2.51 | 12.6% |
| 4M PEO (5 wt %) | 5.00 | 25.0% |
| TEGDVE | 0.62 | 3.7% |
| BAPO | 1.65 | 8.3% |
| Total | 20 | 100% |

Example 5

|  | Weight (g) | % |
| --- | --- | --- |
| Water | 6.9 | 34.5% |
| Acrylic Acid | 1.92 | 9.6% |
| KOH | 1.4 | 7.0% |
| $NH_4Cl$ | 2.51 | 12.6% |
| 4M PEO (5 wt %) | 5.00 | 25.0% |
| TEGDVE | 0.62 | 3.7% |
| BAPO | 1.65 | 8.3% |
| Total | 20 | 100% |

Example 6

|  | Weight (g) | % |
| --- | --- | --- |
| Water | 6.3 | 31.5% |
| Acrylic Acid | 1.72 | 8.9% |
| KOH | 1.2 | 6.0% |
| $NH_4Cl$ | 3.92 | 19.6% |
| 4M PEO (5 wt %) | 4.80 | 24.0% |
| TEGDVE | 0.52 | 2.6% |
| BAPO | 1.56 | 7.8% |
| Total | 16.4 | 100% |

Example 7

|  | Weight (g) | % |
| --- | --- | --- |
| Water | 6.3 | 31.5% |
| Acrylic Acid | 1.72 | 8.9% |
| KOH | 1.2 | 6.0% |
| $NH_4Cl$ | 3.92 | 19.6% |
| 4M PEO (12 wt %) | 4.80 | 24.0% |

|  | Weight (g) | % |
| --- | --- | --- |
| TEGDVE | 0.52 | 2.6% |
| BAPO | 1.56 | 7.8% |
| Total | 16.4 | 100% |

Figure 4:
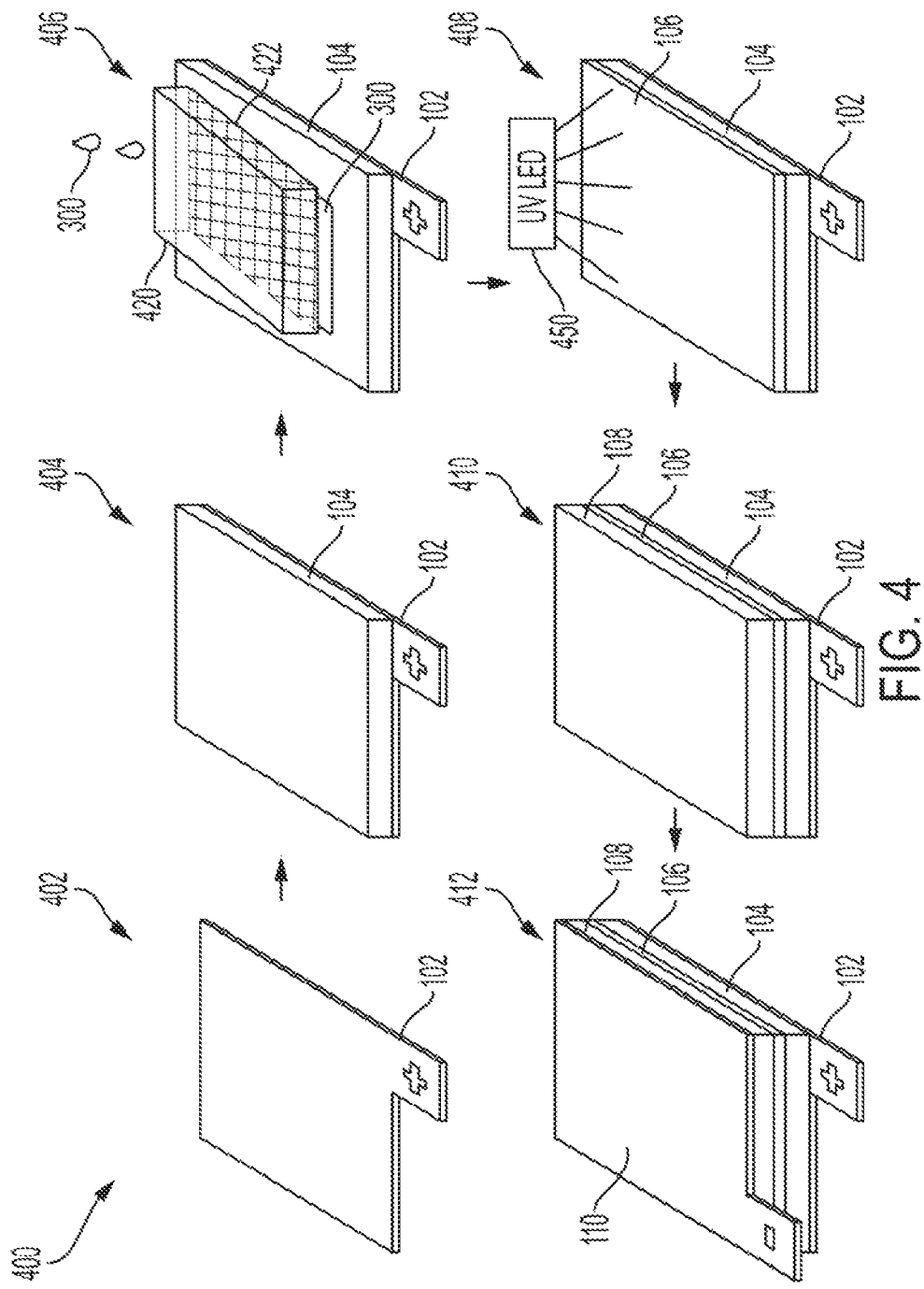
FIG. 4 illustrates an example process flow diagram of fabricating a thin-film battery with an electrolyte of the present disclosure.

FIG. 4 illustrates an example process flow 400 for fabricating the battery 100 of the present disclosure. However, it should be noted that the battery 200 may be fabricated similarly by printing the cathode layer 204 and the anode layer 208 in parallel on the electrolyte layer 206. The process flow 400 may be performed by various machines in a production environment under the control of a central controller or processor. For example, the process flow 400 may use 3D printers, UV LED curing machines, and other apparatuses to perform various blocks of the process flow 400.

At block 402, the cathode current collector 102 may be printed. The cathode current collector 102 may be printed from a conductive metal, such as Ag, using a 3D printer.

At block 404, the cathode layer 104 may be printed on the cathode current collector 102. The cathode current collector 104 may be printed from $MnO_2$ using a 3D printer.

At block 406, the formulation 300 may be dispensed onto the cathode layer 104. In one embodiment, the formulation 300 may be dispensed via a 3D printer on desired locations of the cathode layer 104. In one embodiment, a well 420 may be placed (or formed) over the cathode layer 104 to contain the formulation 300 on a desired location of the cathode layer 104. The well 420 may be comprised of glass spacers that are fastened around the cathode layer 104. The well 420 may then be covered by cellotape.

In one embodiment, the well 420 may be a stencil or be fabricated with a particular shape. Although a rectangular well 420 is illustrated in FIG. 4, it should be noted that the well 420 may have any desired shape depending on the shape of the battery.

In one embodiment, a screen 422 may be used instead of the well 420. The formulation 300 may be poured over the screen 422 and leveled by a squeegee. The screen 422 may direct the formulation 300 onto desired locations of the cathode layer 104.

At block 408, the electrolyte layer 106 may be formed by curing the formulation 300 that is deposited in block 406 via the well 420 or the screen 422. The formulation 300 may be cured using a UV LED 450. In one embodiment, a 14 Watt (W) 395 nm LED light source may be used to cure the formulation 300. The formulation may cure within 30 seconds using the example UV LED light source with the well 420 or within 1 second using the screen 422. In one embodiment, the block 408 may be repeated for multiple passes to cure the formulation 300.

At block 410, the anode layer 108 may be printed on the electrolyte layer 106. The anode layer 108 may be printed from Zn using a 3D printer.

At block 412, the anode current collector 110 may be printed. The anode current collector 110 may be printed from a conductive material such as Ag, using a 3D printer.

Although the process flow 400 illustrates a particular order, it should be noted that the process flow 400 may be performed in a different order. For example, the anode current collector 110 may be printed first, followed by printing the anode layer 108, then performing blocks 406 and 408. The cathode layer 104 may then be printed followed by printing the cathode current collector 102.

Figure 5:
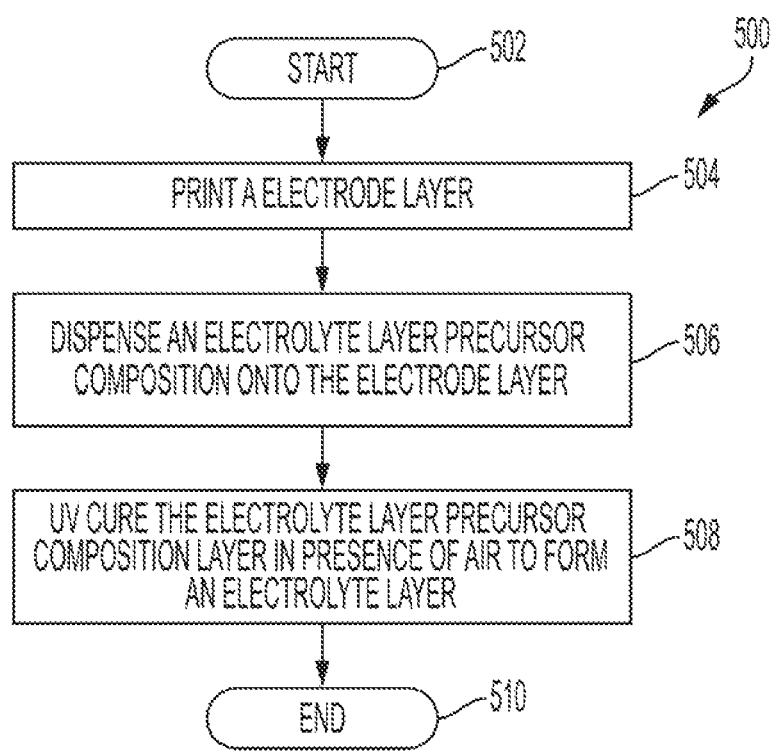
FIG. 5 illustrates a flowchart of an example method for fabricating a thin-film battery with an electrolyte of the present disclosure.

FIG. 5 illustrates a flowchart of an example method 500 for fabricating a thin-film battery with an electrolyte of the present disclosure. In one embodiment, one or more blocks of the method 500 may be performed by various tools or machines under the control of a central controller or processor.

At block 502, the method 500 begins. At block 504, the method 500 prints an electrode layer. The electrode layer may be the cathode layer or the anode layer. In one embodiment, the cathode layer may be printed from manganese dioxide ($MnO_2$). For example, a 3D printer may print the cathode layer on a cathode current collector that is printed from a conductive metal, such as Ag. Any type of additive printing process or 3D printer may be used. For example, any type of 3D printing process can be used such as fused deposition modeling (FDM), selective laser sintering (SLS), selective laser melting (SLM), binder jetting, and the like.

In one embodiment, the anode layer may be printed with zinc (Zn). For example, a 3D printer may print the anode layer on an anode current collector that is printed from a conductive metal, such as Ag.

At block 506, the method 500 dispenses an electrolyte layer precursor composition onto a substrate. In one embodiment, the electrolyte layer precursor composition may include water, an acid, a phosphine oxide, a water miscible polymer, a salt, a neutralizing agent, and a cross-linker. In one embodiment, the electrolyte precursor composition may comprise a mixture of water, acrylic acid, bisacylphosphine oxide (BAPO), polyethylene oxide (PEO), ammonium chloride ($NH_4Cl$) salt, potassium hydroxide (KOH), and triethylene glycol divinyl ether (TEGDVE). In one embodiment, different variations of PEO may be used depending on the formulation 300. For example, 10 weight percent (10 wt %) 600,000 molar volume PEO, 5 wt % 4,000,000 molar volume PEO, or 12 wt % 4,000,000 molar volume may be used in the UV curable mixture.

In one embodiment, the BAPO may be a long-wavelength UV absorbing photoinitiator that is typically sensitive to oxygen and does not exhibit good surface cure on its own. However, the UV curable mixture of the present disclosure includes additional compounds with the BAPO that allow the UV curable mixture to cure quickly (e.g., within seconds) under UV light emitting diodes (e.g., wavelengths of approximately 395 nanometers (nm)) without surface inhibition. In addition, there may be sufficient loading of the BAPO to overcome the oxygen inhibition phenomenon. An example of the BAPO may be a compound that is identified by its tradename Omnirad 819 or Irgacure 819.

In one embodiment, the UV curable mixture may vary the amounts of the water, the acrylic acid, the BAPO, the PEO, the $NH_4Cl$ salt, the KOH, and the cross-linker. The UV curable mixture may vary in weight between approximately 16 grams (g) and 100 g. In one embodiment, the water may comprise between 31 weight percent to 37 weight percent of a total weight of the UV curable mixture. In one embodiment, the acrylic acid may comprise between approximately 8 weight percent to 11 weight percent of a total weight of the UV curable mixture. In one embodiment, the BAPO may comprise between 7 weight percent to 15 weight percent of a total weight of the UV curable mixture. In one embodiment, the $NH_4Cl$ salt may comprise between 2 weight percent to 20 weight percent of a total weight of the UV curable mixture. In one embodiment, the KOH may comprise between 6 weight percent to 9 weight percent of a total weight of the UV curable mixture. In one embodiment, the PEO may comprise between 20 weight percent to 25 weight percent of a total weight of the UV curable mixture. In one embodiment, the cross-linker may comprise between 2 weight percent to 4 weight percent of a total weight of the UV curable mixture. Examples of the different mixtures are provided in Examples 1-7 above.

At block 508, the method 500 ultraviolet (UV) cures the electrolyte layer precursor composition in presence of air. For example, a 14 Watt (VV) 395 nm LED light source may be used to cure the electrolyte layer. In addition, the electrolyte layer may be cured in ambient conditions in the presence of air or oxygen. In other words, curing does not use oxygen inhibition or curing in the presence of inert $N_2$ gas. As a result, the curing operation may be simplified.

In addition, the mixture that forms the electrolyte layer may cure relatively quickly (e.g., within seconds, 30 seconds, or less than a minute). As a result, the speed of fabrication may also be improved.

In one embodiment, the UV light may also contribute to the polymerization of the acid (e.g., the acrylic acid). A monomer of the acid (e.g., the acrylic acid) may be present in the electrolyte layer precursor composition and then polymerized to form an acid polymer (e.g., polyacrylic acid) during the UV curing.

After the electrolyte layer is formed, the anode layer and the cathode layer may be coupled to the electrolyte layer. For example, the electrode layer may be the cathode layer and the anode layer may be coupled to the cathode layer or vice versa. For example, the anode layer may be coupled on top of the electrolyte layer such that the electrolyte layer is located between the anode layer and the cathode layer (e.g., the battery 100).

In one embodiment, the anode layer may be coupled to the electrolyte layer on the same side that the cathode layer is coupled to the electrolyte layer. In other words, the anode layer may be coupled to the electrolyte layer in a side-by-side fashion with the cathode layer (e.g., the battery 200). At block 510, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A composition, comprising:
an ultra-violet (UV) curable mixture comprising water, an acid, a phosphine oxide, a water miscible polymer, a salt, and a neutralizing agent; and
a cross-linker comprising triethylene glycol divinyl ether (TEGDVE).

2. The composition of claim 1, wherein the cross-linker comprises between 2 weight percent to 4 weight percent of a total weight of the UV curable mixture.

3. The composition of claim 1, wherein the water miscible polymer comprises polyethylene oxide (PEO).

4. The composition of claim 3, wherein the PEO comprises at least one of 10 weight percent (10 wt%) 600,000 molar volume PEO, 5 wt% 4,000,000 molar volume PEO, or 12 wt% 4,000,000 molar volume PEO.

5. The composition of claim 1, wherein the water comprises between 31 weight percent to 37 weight percent of a total weight of the UV curable mixture.

6. The composition of claim 1, wherein the acid comprises between 8 weight percent to 11 weight percent of a total weight of the UV curable mixture.

7. The composition of claim 1, wherein the phosphine oxide includes one or more photoinitiators and comprises biscylphosphine oxide (BAPO) or mono-acyl phosphine oxide (MAPO).

8. The composition of claim 7, wherein the phosphine oxide comprises BAPO in an amount between 7 weight percent to 15 weight percent of a total weight of the UV curable mixture.

9. The composition of claim 1, wherein the water miscible polymer comprises between 20 weight percent to 25 weight percent of a total weight of the UV curable mixture.

10. The composition of claim 1, wherein the salt comprises ammonium chloride ($NH_4Cl$) salt in an amount between 2 weight percent to 20 weight percent of a total weight of the UV curable mixture.

11. The composition of claim 1, wherein the neutralizing agent comprises potassium hydroxide (KOH) in an amount between 6 weight percent to 9 weight percent of a total weight of the UV curable mixture.

12. A battery, comprising:
a cathode layer;
an anode layer; and
an electrolyte layer coupled to the cathode layer and the anode layer, wherein the electrolyte layer comprises a cross-linked polymer and phosphine oxide, wherein the cross-linked polymer is formed from a mixture of water, an acid, the phosphine oxide with one or more photoinitiators, a water miscible polymer, a salt, a neutralizing agent, and a cross-linker comprising triethylene glycol divinyl ether (TEGDVE) that is consumed during curing under a UV light to form the electrolyte layer.

13. The battery of claim 12, wherein the electrolyte layer is located between the cathode layer and the anode layer.

14. The battery of claim 12, wherein the cathode layer and the anode layer are positioned side-by-side on the electrolyte layer.

15. The battery of claim 12, wherein the phosphine oxide comprises biscylphosphine oxide (BAPO) or mono-acyl phosphone oxide (MAPO).

16. A method, comprising:
printing an electrode layer;
dispensing an electrolyte layer precursor composition onto the electrode layer, wherein the electrolyte layer precursor composition comprises water, an acid, a phosphine oxide, a water miscible polymer, a salt, a neutralizing agent, and a cross-linker comprising triethylene glycol divinyl ether (TEGDVE); and
ultraviolet light curing the electrolyte layer precursor composition in presence of air to form an electrolyte layer.

17. The method of claim 15, wherein the electrode layer comprises a cathode layer or an anode layer that is printed and the anode layer is stacked on top of the electrode layer.

18. The method of claim 15, wherein the electrode layer comprises a cathode layer that is printed, wherein an anode layer that is printed is coupled to the electrolyte layer on a same side of the electrolyte layer that is coupled to the cathode layer.

* * * * *